(12) United States Patent
Bergo

(10) Patent No.: US 11,988,150 B2
(45) Date of Patent: May 21, 2024

(54) BYPASS TURBINE ENGINE COMPRISING AT LEAST ONE ACCESSORY OR EQUIPMENT

(71) Applicant: SAFRAN AIRCRAFT ENGINES, Paris (FR)

(72) Inventor: Claire Alexia Bergo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 12 days.

(21) Appl. No.: 17/905,077

(22) PCT Filed: Feb. 18, 2021

(86) PCT No.: PCT/FR2021/050294
§ 371 (c)(1),
(2) Date: Aug. 26, 2022

(87) PCT Pub. No.: WO2021/170942
PCT Pub. Date: Sep. 2, 2021

(65) Prior Publication Data
US 2023/0143382 A1  May 11, 2023

(30) Foreign Application Priority Data

Feb. 27, 2020  (FR) ...................................... 2001949

(51) Int. Cl.
*F02C 7/32*  (2006.01)
*F01D 15/10*  (2006.01)
*F02C 7/36*  (2006.01)

(52) U.S. Cl.
CPC ................ *F02C 7/32* (2013.01); *F01D 15/10* (2013.01); *F02C 7/36* (2013.01);
(Continued)

(58) Field of Classification Search
CPC .... F02C 7/32; F02C 7/36; F01D 15/10; F05D 2220/76; F05D 2220/323; F05D 2260/40; H02K 7/1823
See application file for complete search history.

(56) References Cited

U.S. PATENT DOCUMENTS 5,410,870 A * 5/1995 Brault ....................... F02C 7/32
60/39.83
5,694,765 A * 12/1997 Hield ...................... F02C 3/113
60/39.163
(Continued)

FOREIGN PATENT DOCUMENTS

EP  3282093 A1  2/2018
FR  3016408 A1  7/2015

OTHER PUBLICATIONS

International Search Report for issued in Application No. PCT/FR2021/050294 dated Jun. 14, 2021.
(Continued)

*Primary Examiner* — David P. Olynick
(74) *Attorney, Agent, or Firm* — Pearne & Gordon LLP

(57) ABSTRACT

A bypass turbine engine includes a fixed casing, a first shaft (low-pressure shaft), a second shaft (high-pressure shaft), at least one accessory to be driven by a motor powered with electrical energy, a first intermediate shaft tapping mechanical power off the low-pressure shaft, a second intermediate shaft tapping mechanical power off the high-pressure shaft, and an electrical energy generator assembly coupled to the first and second intermediate shafts so as to receive mechanical power from the first and second intermediate shafts. The generator assembly converts the mechanical power received from the first and second intermediate shafts into electrical energy to power the motor or motors, which comes simultaneously from the mechanical power tapped off the low-pressure shaft and the mechanical power tapped off
(Continued)

the high-pressure shaft. The generator assembly is housed in an arm in the lower part of the turbine engine and extending vertically into a bypass flow duct.

13 Claims, 5 Drawing Sheets

(52) U.S. Cl.
CPC .... *F05D 2220/323* (2013.01); *F05D 2220/76* (2013.01); *F05D 2260/40* (2013.01)

(56) References Cited

U.S. PATENT DOCUMENTS

| | | | | |
|---|---|---|---|---|
| 7,168,913 | B2* | 1/2007 | Lardellier | F02C 7/32 415/70 |
| 7,997,085 | B2* | 8/2011 | Moniz | F01D 25/34 60/788 |
| 11,371,379 | B2* | 6/2022 | van der Merwe | F01D 15/10 |
| 2006/0101804 | A1* | 5/2006 | Stretton | F02K 3/04 60/226.1 |
| 2008/0006023 | A1* | 1/2008 | Lardellier | H02K 16/005 60/226.1 |
| 2010/0326050 | A1* | 12/2010 | Schilling | H02K 16/02 60/268 |
| 2013/0024753 | A1 | 9/2013 | Hoppe | |
| 2013/0247539 | A1* | 9/2013 | Hoppe | F02C 7/32 60/39.15 |
| 2021/0102499 | A1* | 4/2021 | Leque | F16H 3/46 |

OTHER PUBLICATIONS

Written Opinion for PCT/FR2021/050294 dated Jun. 14, 2021.
Search Report issued in French Patent Application No. 2001949 dated Oct. 20, 2020.

* cited by examiner

BYPASS TURBINE ENGINE COMPRISING AT LEAST ONE ACCESSORY OR EQUIPMENT

This is the National Stage of PCT international application PCT/FR2021/050294, filed on Feb. 18, 2021 entitled "BYPASS TURBINE ENGINE COMPRISING AT LEAST ONE ACCESSORY OR EQUIPMENT", which claims the priority of French Patent Application No. 2001949 filed Feb. 27, 2020, both of which are incorporated herein by reference in their entireties.

TECHNICAL FIELD

The invention relates to a bypass turbine engine comprising at least one accessory or equipment, such as an oil pump, a fuel pump or even a hydraulic pump.

STATE OF THE PRIOR ART

Conventionally, a bypass turbine engine comprises a fan intended to suck in a gas stream which is divided, downstream of the fan, into a primary gas stream circulating in a primary stream flow channel, called primary flow path, within a core of the turbine engine extending along a longitudinal axis of axial direction, and into a secondary gas stream bypassing this core in a secondary stream flow channel, called secondary flow path.

In the primary flow path, the primary gas flow passes through, from upstream to downstream in the axial direction of gas flow, a low pressure compressor, a high pressure compressor, a combustion chamber, a high pressure turbine, a low turbine pressure and an exhaust nozzle. In the secondary flow path, the secondary air stream passes through a fan rectifier.

The low pressure compressor and the low pressure turbine are connected by a first shaft, called the low pressure shaft, rotating about the longitudinal axis, while the high pressure compressor and the high pressure turbine are connected by a second shaft, called high shaft pressure, rotating around the low pressure shaft. The low pressure shaft and the high pressure shaft are both part of the core of the turbine engine.

When the turbine engine has a relatively high by-pass ratio, also called "BPR", it may be advantageous for the fan to be mechanically driven by the low pressure shaft via a reduction gear.

In order to lubricate and cool this reduction gear, it is known to equip the turbine engine with a lubrication system, in particular an oil circuit comprising an oil tank and a lubrication pump which is mechanically driven by a transmission gear box, also called Accessory Gear Box or "AGB", and which draws mechanical power from the high pressure shaft via an intermediate shaft, called "RDS" for "Radial Drive Shaft".

However, in the "windmilling" phase of the turbine engine which corresponds to an autorotation of the fan, the speed of rotation of the high pressure shaft is low relative to that of the low pressure shaft. The mechanical power taken from the high pressure shaft and transmitted to the oil pump may thus not be sufficient to allow the oil pump to deliver the oil required for the lubrication and cooling of the reduction gear, which is nevertheless biased by the autorotation of the fan and which therefore risks being damaged or even to break.

If the turbine engine does not comprise a reduction gear, it is also possible that during the "windmilling" phase, the oil pump rotates too slowly to deliver all oil required for the lubrication and cooling of the bearings which support the high and low pressure shafts. An auxiliary lubrication system, for example using a second oil pump, may then be required. A single oil pump is generally provided, but its sizing is impacted by the constraints of the lubrication during the low rotational speeds of the high pressure shaft.

Whether or not the turbine engine comprises a reduction gear, the lubrication constraints during the low rotational speeds of the high pressure shaft have a significant impact on the sizing, and therefore the space requirement and the mass, of the lubrication system driven by the mechanical power drawn from the high pressure shaft.

Similar difficulties can be found at low speeds concerning other accessories, such as a fuel pump of the turbine engine.

DISCLOSURE OF THE INVENTION

The invention aims at overcoming the drawback mentioned below, by proposing a bypass turbine engine comprising a low pressure shaft, a high pressure shaft and an electrical energy generator assembly which draws off mechanical power, on the one hand, from the low pressure shaft via a first intermediate shaft, and on the other hand, from the high pressure shaft via a second intermediate shaft, to power one or more accessories, such as an oil pump, with electrical energy.

More specifically, the invention relates to a bypass turbine engine comprising, from upstream to downstream in an axial direction of gas flow, a fan and a splitter nose from which originate a primary stream flow channel, called primary flow path, and a secondary stream flow channel, called secondary flow path, which surrounds the primary flow path, the turbine engine further comprising:

- a fixed casing comprising an arm which extends radially, relative to the longitudinal axis, in the secondary flow path,
- a first shaft, called low pressure shaft, designed to rotate relative to the casing about a longitudinal axis oriented in the axial direction of gas flow,
- a second shaft, called high pressure shaft, designed to rotate relative to the casing around the low pressure shaft, the high pressure and low pressure shafts being concentric,
- at least one accessory driven by a motor,
- an upper portion via which the turbine engine is intended to be attached to an aircraft,
- an opposite lower portion in a vertical direction orthogonal to the longitudinal axis, the arm extending generally vertically, in the lower portion, in the secondary flow path,
- a first intermediate shaft designed to draw mechanical power from the low pressure shaft,
- a second intermediate shaft designed to draw mechanical power from the high pressure shaft,
- an electrical energy generator assembly housed in the arm and coupled, on the one hand, to the first intermediate shaft and, on the other hand, to the second intermediate shaft, so as to receive mechanical power from the first intermediate shaft, on the one hand, and from the second intermediate shaft, on the other hand, the generator assembly being further designed to convert the mechanical power received from the first and second intermediate shafts into electrical energy in order to power the motor(s) driving the accessory or accessories, the electrical energy powering the motor(s) driving the accessory or accessories thus originating simultaneously from the mechanical power drawn from the low pressure shaft and the mechanical power drawn from the high pressure shaft.

According to variant embodiments which can be taken together or separately:
- the first and second intermediate shafts are coaxial and each designed to rotate, independently of each other, relative to the casing about the same intermediate axis;
- the secondary flow path is delimited radially, relative to the longitudinal axis, by an outer shroud and an inner hub of the structural casing, the outer shroud and the hub being concentric and centred on the longitudinal axis;
- the arm, which houses the generator assembly, extends radially, relative to the longitudinal axis, between the outer shroud and the hub;
- the arm houses, upstream in the axial direction of gas flow, ancillaries and, downstream in the axial direction of gas flow, the generator assembly;
- the generator assembly comprises:
  - a first drive shaft designed to draw mechanical power from the first intermediate shaft and to rotate relative to the casing about a first drive axis,
  - a second drive shaft designed to draw mechanical power from the second intermediate shaft and to rotate relative to the casing about a second drive axis, the first and second drive shafts being coaxial and each designed to rotate, in an opposite direction of rotation, about the first and second drive axes then coincident,
  - one or more first alternator(s) each comprising an inductor rotor mounted secured in rotation with one of the first and second drive shafts about the first and second drive axes and an induced rotor mounted secured in rotation with the other of the first and second drive shafts about the first and second drive axes,
  - one or more second alternators each comprising an inductor rotor mounted secured in rotation, about the first and second drive axes, with that of the first and second drive shafts which is surrounded by the other of the first and second drive shafts, and an induced stator which is fixed relative to the inductor rotor of said second alternator;
- first and second drive axes are oriented generally in the axial direction of gas flow;
- the generator assembly comprises:
  - a third drive shaft designed to draw mechanical power from the first drive shaft and to rotate relative to the casing about a third drive axis,
  - a fourth drive shaft designed to draw mechanical power from the second drive shaft and to rotate relative to the casing about a fourth drive axis, the third and fourth drive shafts being coaxial and each designed to rotate, in an opposite direction of rotation, about the third and fourth drive axes then coincident,
  - one or more third alternators each comprising an inductor rotor mounted secured in rotation with one of the third and fourth drive shafts about the third and fourth drive axes and an inductor rotor mounted secured in rotation with the other of the third and fourth drive shafts about the third and fourth drive axes,
  - one or more fourth alternators each comprising an inductor rotor mounted secured in rotation, about the third and fourth drive axes, with that of the third and fourth drive shafts, and an induced stator which is fixed relative to the inductor rotor of said fourth alternator.
- the longitudinal axis and the first, second, third and fourth drive axes are comprised in the same plane;
- the third and fourth drive axes are respectively parallel to the first and second drive axes;
- the first and second drive axes are oriented generally in the axial direction of gas flow, the third and fourth drive shafts being located radially outside relative to the longitudinal axis, while the first and second drive shafts are located radially inside
- the first alternator(s) are located upstream in the axial direction of gas flow and the second alternator(s) are located downstream in the axial direction of gas flow or
- the first and third alternators are located upstream in the axial direction of gas flow, and the second and fourth alternators are located downstream in the axial direction of gas flow.
- the first alternator(s) and the second alternator(s) are respectively housed in a first housing and in a second housing themselves housed in the arm, the first housing having a transverse dimension, taken in a transverse direction, generally horizontal, perpendicular to the axial dimension of gas flow, which is greater than that of the second housing; and/or
- the third alternator(s) and the fourth alternator(s) are respectively housed in the first housing or a third housing itself housed in the arm and in the second housing or a fourth housing itself housed in the arm, the third housing having a transverse dimension, taken in a transverse direction, generally horizontal, perpendicular to the axial dimension of gas flow, which is greater than that of the fourth housing;
- the first housing and/or the third housing is arranged in contact with a wall of the arm;
- the generator assembly comprises:
  - an inner drive shaft designed to rotate relative to the casing about a drive axis and to draw mechanical power from the first intermediate shaft or from the second intermediate shaft,
  - an outer drive shaft designed to rotate relative to the casing around the inner drive shaft in an opposite direction of rotation and to draw mechanical power from the second intermediate shaft or from the first intermediate shaft, the inner and outer drive shafts being concentric,
  - one or more alternators each comprising an inner body, inductor or induced, mounted secured in rotation with the inner drive shaft about the drive axis and an outer body, induced or inductor, mounted secured in rotation with the outer drive shaft about the drive axis and located opposite to the inner body;
- the drive axis is oriented generally radially relative to the longitudinal axis; or
- the drive shaft is oriented generally along the axial direction of gas flow;
- the turbine engine further comprises a regulation system through which the generator assembly delivers electrical energy to the accessory or accessories;
- the secondary flow path is separated from the primary flow path by an inter-flow path compartment in which the accessory or accessories are housed;
- the accessory or accessories are selected from:
  - an oil pump,
  - a fuel pump,
  - a hydraulic pump.

BRIEF DESCRIPTION OF DRAWINGS

Other aspects, aims, advantages and features of the invention will appear better on reading the following detailed description of preferred embodiments thereof, given by way of non-limiting example, and made with reference to the appended drawings in which.

DETAILED DESCRIPTION

Figure 1:
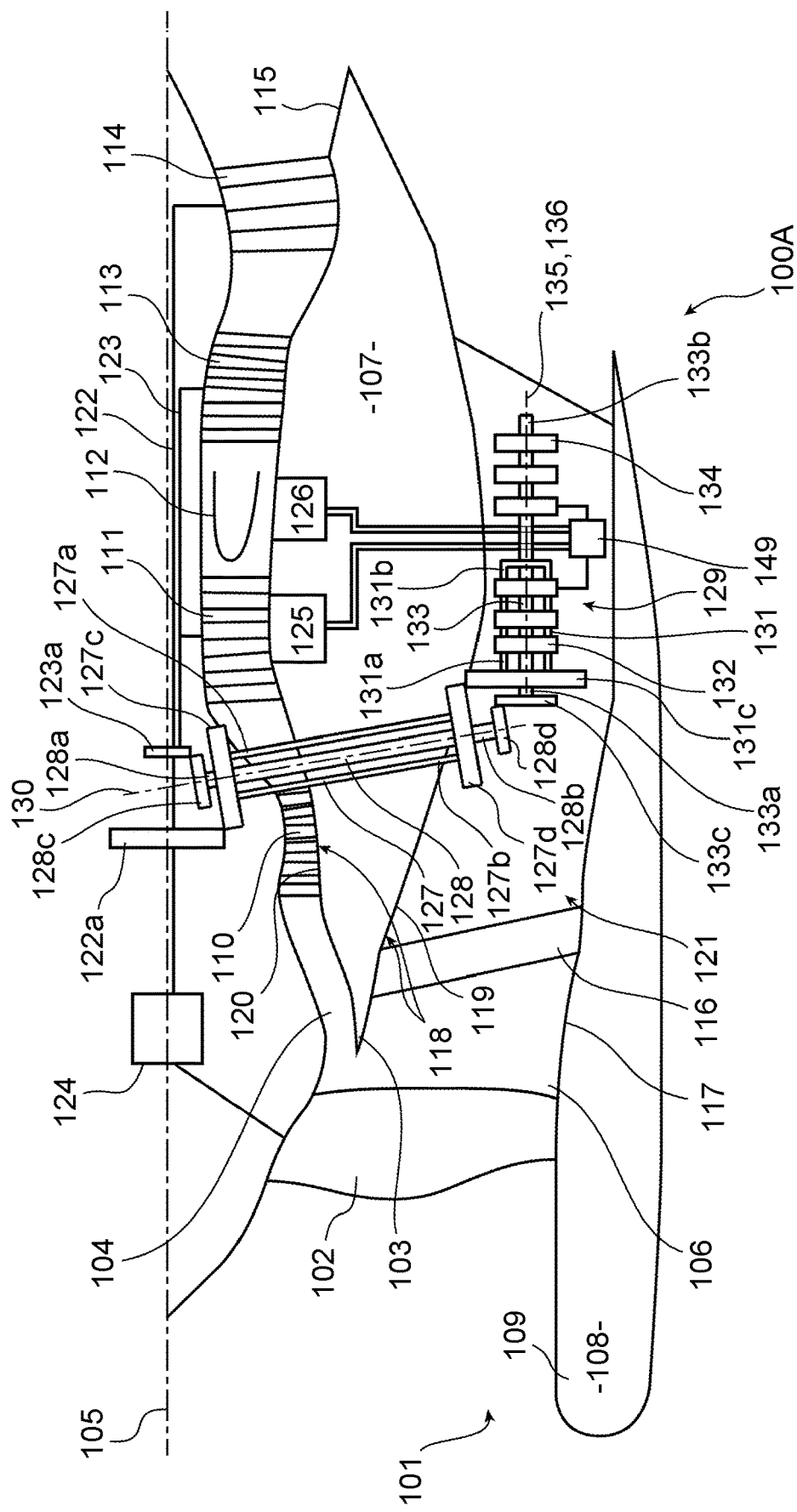
FIG. 1 is a schematic view, in longitudinal section, of a bypass turbine engine according to a first embodiment of the invention.
Figure 2:
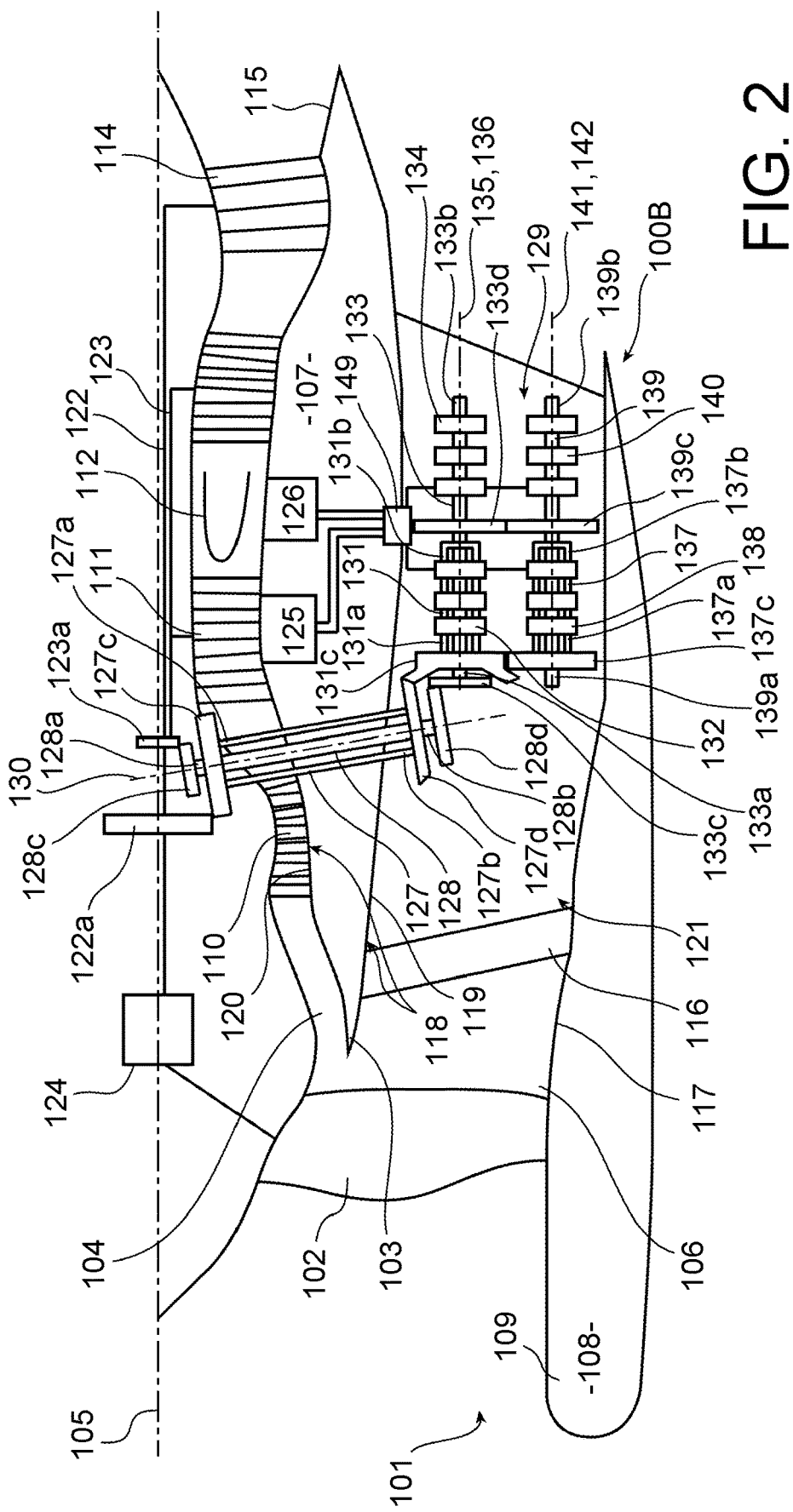
FIG. 2 is a schematic view, in longitudinal section, of a bypass turbine engine according to a second embodiment of the invention.
Figure 3:
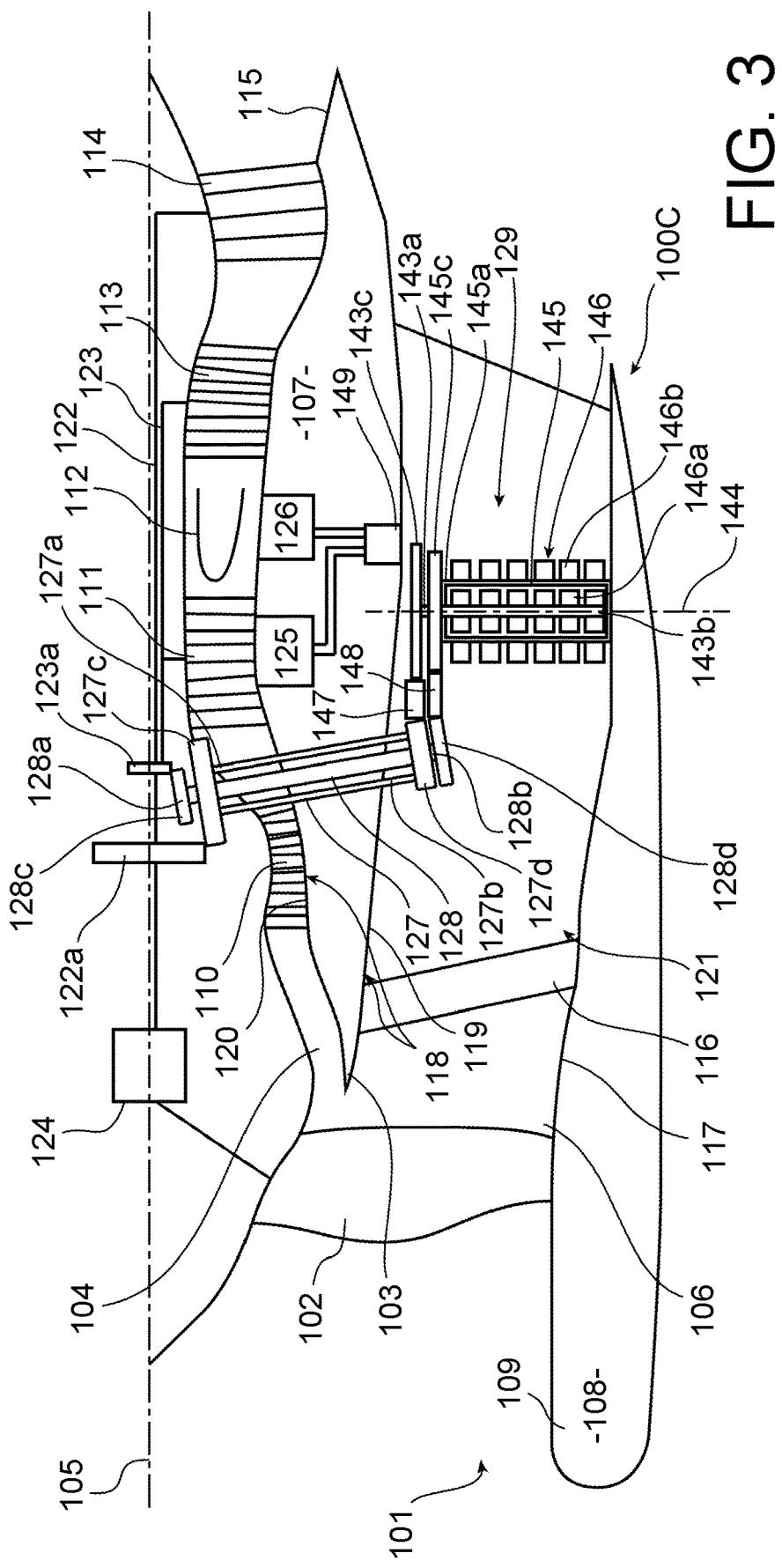
FIG. 3 is a schematic view, in longitudinal section, of a bypass turbine engine according to a third embodiment of the invention.

FIGS. 1 to 3 show a bypass turbine engine 100A, 100B, 100C of an aircraft respectively according to first, second and third embodiments of the invention. The components common to these three embodiments of the invention bear the same references.

Preliminarily, there are defined an axial direction, a radial direction which is orthogonal to the axial direction and a circumferential direction which is orthogonal to the axial and radial directions.

In the remainder of the description, the terms "upstream" and "downstream" are used with reference to the axial direction of gas flow.

A vertical direction is also defined, which is orthogonal to the longitudinal direction and oriented from bottom to top.

The turbine engine 100A, 100B, 100C comprises, from upstream to downstream, an air inlet 101, a fan 102 and a splitter nose 103 from which originate an annular primary stream flow channel 104, called primary flow path, formed within a core of the turbine engine 100A, 100B, 100C extending along a longitudinal axis 105 oriented axially, and a secondary stream flow channel 106, called secondary flow path, surrounding the primary flow path 104 and separated from the primary flow path 104 by an inter-flow path compartment 107. The primary flow path 104 and the secondary flow path 106 are centred on the longitudinal axis 105.

The turbine engine 100A, 100B, 100C is further faired by a nacelle 108 which surrounds the secondary flow path 106 and which is intended to be fastened to the aircraft at the upper portion thereof. The nacelle 108, in particular, comprises a fan casing 109 which surrounds the fan 102 and which defines, upstream of the fan 102, the air inlet 101.

The primary flow path 104 itself comprises, from upstream to downstream, a low pressure compressor 110, a high pressure compressor 111, a combustion chamber 112, a high pressure turbine 113, a low pressure turbine 114 and an exhaust nozzle 115. The secondary flow path 106 comprises a fan rectifier 116, also called "OGV" for "Outlet Guide Vane".

The turbine engine 100A, 100B, 100C further comprises a fixed casing 117, 118, 121 itself comprising an outer shroud 117 and an inner hub 118 located downstream of the splitter nose 103. The outer shroud 117 and the hub 118 are concentric and centred on the longitudinal axis 105.

The hub 118 comprises an outer annular wall 119 which delimits, with the outer shroud 117, the secondary flow path 106 and an inner annular wall 120 which delimits the primary flow path 104. The outer shroud 117 thus surrounds the secondary flow path 106 which surrounds the hub 118. The hub 118 itself surrounds the primary flow path 104.

The outer shroud 117 thus partially forms the nacelle 108. It is for example located downstream of the fan casing 109.

The outer annular wall 119 and the inner annular wall 120 further together delimit the inter-flow path compartment 107.

The casing also comprises a plurality of arms 121 which extend radially, relative to the longitudinal axis 105, between the outer shroud 117 and the hub 118, in particular the outer annular wall 119 of the hub 118, and which are evenly distributed about the longitudinal axis 105.

One of the arms 121 is for example located at 6 o'clock by analogy with the dial of a clock. In other words, this arm 121 is located in the lower portion of the turbine engine 100A, 100B, 100C and extends both radially and vertically between the outer shroud 117 and the hub 118.

The arms 121 can house ancillaries 170 (schematically illustrated in FIG. 4), such as conduits, pipes, electrical harnesses, etc.

The arms 121 can house ancillaries (not represented), such as conduits, pipes, electrical harnesses, etc.

The turbine engine 100A, 100B, 100C also comprises a first shaft 122, called low pressure shaft, designed to rotate relative to the casing 117, 118, 121 about the longitudinal axis 105, as well as a second shaft 123, called high pressure shaft, designed to rotate relative to the casing 117, 118, 121 around the low pressure shaft 122. The low and high pressure shafts 122, 123 are concentric.

The low pressure shaft 122 and the high pressure shaft 123 are both part of the core of the turbine engine 100.

For example, the low pressure shaft 122 connects the low pressure compressor 110 and the low pressure turbine 114, while the high pressure shaft 123 connects the high pressure compressor 111 and the high pressure turbine 113.

The low pressure shaft 122 also drives the fan 102 in rotation about the longitudinal axis 105, relative to the casing 117, 118, 121, for example via a reduction gear 124. The fan 102 is thus indirectly driven by the low pressure shaft 122. Alternatively (not represented), the fan 102 can be directly driven by the low pressure shaft 122.

The low pressure shaft 122 and the high pressure shaft 123 are for example designed to rotate about the longitudinal axis 105 in the same direction of rotation. This is, in particular, the case of the low and high pressure shafts 122, 123 of the turbine engine 100C of the third embodiment (FIG. 3). Alternatively, the low pressure shaft 122 and the high pressure shaft 123 are designed to rotate about the longitudinal axis 105 in opposite directions of rotation.

The turbine engine 100A, 100B, 100C is further equipped with one or more accessories or equipment, such as an oil pump 125, a fuel pump 126 or even a hydraulic pump. Of course, this list is not exhaustive.

The oil pump 125 is for example designed to deliver oil originating from an oil reservoir (not represented) to the reduction gear 124, and/or to bearings (not represented) which support the low and high pressure shafts 122, 123 and which are carried by the casing 117, 118, 121. The oil pump 125 thus allows ensuring the lubrication and the cooling of the reduction gear 124 and/or the bearings, and therefore the cooling of the turbine engine 100A, 100B, 100C.

The fuel pump 126 is for example designed to deliver fuel to the combustion chamber 112 for the combustion of gases within said combustion chamber 112.

The accessory or accessories 125, 126 are further designed to be mechanically driven by a motor (not represented) powered with electrical energy. This motor is thus designed to drive in movement a movable portion of the accessory 125, 126, for example a rotating portion such as the rotor of a pump. This motor can be integrated into the accessory 125, 126, the motor and the accessory 125, 126 that it drives, thus forming a one-piece assembly. Alternatively, the motor can be independent or even separate from the accessory or accessories 125, 126 that it drives.

The accessories 125, 126 are for example housed in the inter-flow path compartment 107. Alternatively (not represented), the accessories 125, 126 are housed in the nacelle 108. Still alternatively (not represented), a portion of the accessories 125, 126 is housed in the inter-flow path compartment 107 and another portion of the accessories 125, 126 is housed in the nacelle 108.

According to the invention, the turbine engine 100A, 100B, 100C further comprises a first intermediate shaft 127 designed to draw mechanical power from the low pressure shaft 122, a second intermediate shaft 128 designed to draw mechanical power from the high pressure shaft 123 and an electrical energy generator assembly 129 coupled, on the one hand, to the first intermediate shaft 127 and, on the other hand, to the second intermediate shaft 128, so as to receive mechanical power from the first intermediate shaft 127, on the one hand, and from the second intermediate shaft 128, on the other hand. The generator assembly 129 is further designed to convert the mechanical power received from the first and second intermediate shafts 127, 128 into electrical energy and to power the motor(s), driving the accessory or accessories 125, 126, such as the oil pump 125 and/or the fuel pump 126, with electrical energy.

In this manner, the electrical energy supplied to the accessory or accessories 125, 126, via the motor(s) which drive it or them, originates simultaneously from the mechanical power drawn from the low pressure shaft 122 and from the mechanical power drawn from the high pressure shaft 123.

Thus, in the "windmilling" phase of the turbine engine 100A, 100B, 100C which corresponds to an autorotation of the fan 102, even if the high pressure shaft 123 rotates less quickly than the low pressure shaft 122, the total mechanical power drawn from the low pressure shaft 122 and from the high pressure shaft 123 is sufficient to power the accessory or accessories 125, 126 with electrical energy, via the motor(s) which drive it or them. This allows, in particular, ensuring that the oil pump 125 delivers the oil required for the lubrication and cooling of the reduction gear 124 which is biased by the autorotation of the fan 102 and which would otherwise risk being damaged, or even to break.

Thus, depending on the operating phase of the turbine engine 100A, 100B, 100C, the generator assembly 129 can as well draw mechanical power from the low pressure shaft 122 only, from the high pressure shaft 123 only or from both the low pressure shaft 122 and the high pressure shaft 123. The generator assembly 129 therefore operates either on the speed of the low pressure shaft 122, or on the speed of the high pressure shaft 123, or in hybrid on the two speeds.

The generator assembly 129 thus replaces a transmission gear box, also called Accessory Gear Box or "AGB", which is known to be implemented to mechanically drive the accessory or accessories 125, 126 by drawing mechanical power from the high pressure shaft 123. This allows in particular reducing the lubrication requirements and therefore reducing the volume of the oil reservoir. The generator assembly 129 can further be electrically powered and controlled to operate in motor mode, in order to advantageously replace the starter which usually mechanically drives the high pressure shaft via such a transmission gear box.

The generator assembly 129 is in particular supported by the intermediate casing 117, 118, 121.

The first and the second intermediate shaft 127, 128 are for example coaxial and each designed to rotate, independently of each other, relative to the casing 117, 118, 121, about an intermediate axis 130. The first or the second intermediate shaft 127, 128 thus surrounds the second or the first intermediate shaft 127, 128. In the examples illustrated in FIGS. 1 to 3, it is the first intermediate shaft 127 which surrounds the second intermediate shaft 128.

Alternatively, the first and second intermediate shafts 127, 128 are arranged parallel relative to each other and in the same plane comprising the longitudinal axis 105, the first and second intermediate shafts 127, 128 further being axially offset relative to each other. According to this variant, each of the first and second intermediate shafts 127, 128 is thus designed to rotate relative to the casing 117, 118, 121, about an intermediate axis 130 which is specific thereto.

The first and the second intermediate shafts 127, 128 are for example designed to rotate, in an opposite direction of rotation relative to each other, relative to the casing 117, 118, 121, about the intermediate axis 130 Alternatively, the first and the second intermediate shafts 127, 128 are designed to rotate, in the same direction of rotation, relative to the casing 117, 118, 121, about the intermediate axis 130.

The first and second intermediate shafts 127, 128 each extend along the intermediate axis 130 between a first end 127a, 128a and an opposite second end 127b, 128b.

The first end 127a, 128a of each of the first and second intermediate shafts 127, 128 is designed to draw mechanical power from the low pressure shaft 122 or the high pressure shaft 123.

For this, the first end 127a, 128a of each of the first and second intermediate shafts 127, 128 carries for example a first toothed wheel 127c, 128c which is secured in rotation with the first or the second intermediate shaft 127, 128 about the intermediate axis 130. The first toothed wheel 127c, 128c of the first and second intermediate shafts 127, 128 is further meshed with a toothed wheel 122a, 123a itself carried by the low pressure shaft 122 or the high pressure shaft 123 and mounted secured in rotation on the low pressure shaft 122 or on the high pressure shaft 123 about the longitudinal axis 105.

The first toothed wheels 127c, 128c of the first and second intermediate shafts 127, 128 as well as the toothed wheels 122a, 123a of the low and high pressure shafts 122, 123 are for example conically toothed.

The first end 127a, 128a of each of the first and second intermediate shafts 127, 128 is for example located axially between the toothed wheels 122a, 123a of the low and high pressure shafts 122, 123. Thus, when the low and high pressure shafts 122, 123 rotate in the same direction of rotation, the first and second intermediate shafts 127, 128 rotate in an opposite direction of rotation.

Alternatively, the first end 127a, 128a of each of the first and second intermediate shafts 127, 128 is located axially only on one side of the toothed wheels 122a, 123a of the low and high pressure shafts 122, 123. Thus, when the low and high pressure shafts 122, 123 rotate in an opposite direction of rotation, the first and second intermediate shafts 127, 128 themselves rotate in an opposite direction of rotation.

The second ends 127b, 128b of the first and second intermediate shafts 127, 128 are designed to transmit, independently of each other, mechanical power to the generator assembly 129.

The generator assembly 129 is for example housed in one of the arms 121. In this manner, the generator assembly 129 is cooled by the gas stream, called secondary stream, which circulates in the secondary flow path 106.

The generator assembly 129 is, in particular, housed in the arm 121 located at 6 o'clock. This allows preventing the addition of mass in the arm 121 from disturbing the static equilibrium of the turbine engine 100A, 100B, 100C, by creating a moment of the force of gravity relative to the longitudinal axis 105, which would tend to cause the turbine engine 100A, 100B, 100C to rotate.

For this, the first and second intermediate shafts 127, 128 extend for example from the core of the turbine engine 100A, 100B, 100C through the primary flow path 104 and the inter-flow path compartment 107 to the arm 121 which passes through the secondary flow path 106 and in which the generator assembly 129 is housed. Thus, the first end 127a, 128a of the first and second intermediate shafts 127, 128 is located in the core of the turbine engine 100A, 100B, 100C, while the second end 127b, 128b thereof is located in the arm 121 which houses the generator assembly 129.

The first and second intermediate shafts 127, 128 are for example themselves housed in an arm (not represented) extending from the core of the turbine engine 100A, 100B, 100C to the hub 118, in particular to the annular inner wall 120 of the hub 118. The arm is arranged axially between the low pressure compressor 110 and the high pressure compressor 111.

The generator assembly 129 is, for example, arranged axially downstream of the ancillaries which are also housed in the arm 121. The arm 121 which houses the generator assembly 129 thus extends axially downstream in the secondary flow path 106. This area of the secondary flow path 106, in which the arm 121 extends, is called "bifurcation".

A firewall partition is for example provided between the generator assembly 129 and the inter-flow path compartment 107, in particular at the outer annular wall 119 of the hub 118, so as to limit the risk of fire and heat transfers from the arm 121 which houses the generator assembly 129 towards the inter-flow path compartment 107.

According to the first embodiment illustrated in FIG. 1, the generator assembly 129 of the turbine engine 100A comprises a first drive shaft 131, one or more first alternators 132, a second drive shaft 133 and one or more second alternators 134.

The first drive shaft 131 is designed to draw mechanical power from the first intermediate shaft 127 and to rotate, relative to the casing 117, 118, 121, about a first drive axis 135.

The second drive shaft 133 is designed to draw mechanical power from the second intermediate shaft 128 and to rotate, relative to the casing 117, 118, 121, about a second drive axis 136.

The first and second drive shafts 131, 133 are coaxial and each designed to rotate, independently of each other and in an opposite direction of rotation, about the first and second drive axes 135, 136 which coincide. The first or the second drive shaft 131, 133 thus surrounds the second or the first drive shaft 133, 131. The first and second drive shafts 131, 133 are concentric. They are further counter-rotating. In the example illustrated in FIG. 1, it is the first drive shaft 131 which surrounds the second drive shaft 133. The generator assembly 129 is thus less bulky for the same electrical power produced. This also allows limiting the master cross-section of the arm 121, that is to say the maximum section of the arm 121, taken transversely relative to the longitudinal axis 105. The performance in the "windmilling" phase is improved when it is the first drive shaft 131 which surrounds the second drive shaft 133.

The first alternator(s) 132 each comprise an inductor rotor mounted secured in rotation with one of the first and second drive shafts 131, 133 and an induced rotor mounted secured in rotation with the other of the first and second drive shafts 131, 133 and located facing the inductor rotor. The first alternators 132 are for example evenly distributed along the first and second drive shafts 131, 133.

In this manner, the relative rotation of the inductor rotor of the or each of the first alternators 132 relative to the induced rotor of said first alternator 132 creates a variation in the electromagnetic flux which induces an alternating electric current in the induced rotor.

Moreover, the inductor and induced rotors of the or each of the first alternators 132 being able to rotate in an opposite direction of rotation relative to each other, the generator assembly 129 allows producing more electrical power.

The inductor rotor of the or each of the first alternators 132 comprises, for example, at least one permanent magnet or at least one electromagnet formed by a winding which is direct current powered, while the induced rotor of the or each of the first alternators 132 comprises at least one winding.

The second alternator(s) 134 each comprise an inductor rotor mounted secured in rotation with that of the first and second drive shafts 131, 133 which is surrounded by the other of the first and second drive shafts 131, 133, herein the second drive shaft 133, and an induced stator which is fixed relative to the casing 117, 118, 121 and therefore relative to the inductor rotor. The second alternators 134 are for example evenly distributed along the second drive shaft 133.

In this manner, the rotation of the inductor rotor of the or each of the second alternators 134 relative to the fixed induced stator of said second alternator 134 creates a variation in the electromagnetic flux which induces an alternating electric current in the induced stator.

The fact of multiplying the first alternators 132 and/or the second alternators 134 also allows minimising the heating of the electric generator 129, and thus not making the implementation of a cooling system, which is specifically dedicated to the electric generator 129, mandatory.

The inductor rotor of the or each of the second alternators 134 comprises for example at least one permanent magnet. Alternatively, the inductor rotor of the or each of the second alternators 134 comprises at least one electromagnet formed by a winding which is direct current powered.

The induced stator of the or each of the second alternators 134 comprises for example at least one winding.

The first and second drive shafts 131, 133 each extend along the first and second drive axes 135, 136, which coincide, between a first end 131a, 133a and an opposite second end 131b, 133b.

The first and second alternators 132, 134 are for example arranged on opposite sides of that of the first and second drive shafts 131, 133 which is surrounded by the other of the first and second drive shafts 131, 133, along the first and second drive axes 135, 136. The first alternators 132 are for example arranged on the side of the first end 131a, 133a of that of the first and second drive shafts 131, 133 which is surrounded by the other of the first and second drive shafts 131, 133, while the second alternators 134 are arranged on the side of the second end 131b, 133b of said first or second drive shaft 131, 133. In FIG. 1, the first alternators 132 are arranged on the side of the first end 133a of the second drive shaft 133, while the second alternators 134 are arranged on the side of the second end 133b of the second drive shaft 133.

The first end 131a, 133a of each of the first and second drive shafts 131, 133 is designed to draw mechanical power from the first or second intermediate shaft 127, 128.

For this, the first end 131a, 133a of each of the first and second drive shafts 131, 133 carries for example a first toothed wheel 131c, 133c which is secured in rotation with the first or second drive shaft 131, 133 about the first or the second drive axis 135, 136. The first toothed wheel 131c, 133c of the first and second drive shafts 131, 133 is further meshed with a second toothed wheel 127d, 128d itself carried by the second end 127b, 128b of the first or second intermediate shaft 127, 128 and mounted secured in rotation on the first or the second intermediate shaft 127, 128 about the intermediate axis 130.

The first toothed wheels 131c, 133c of the first and second drive shafts 131, 133 as well as the second toothed wheels 127d, 128d of the first and second intermediate shafts 127, 128 are for example conically toothed.

When the first and second intermediate shafts 127, 128 are designed to rotate in the same direction of rotation, an additional pinion is for example provided to transmit mechanical power between the toothed wheels 127d, 131c of the first intermediate shaft 127 and of the first drive shaft 131 or between the toothed wheels 128d, 133c of the second intermediate shaft 128 and the second drive shaft 133, in order to reverse the direction of rotation of the first and second drive shafts 131, 133.

The first and second drive axes 135, 136, which coincide, are for example coplanar with the longitudinal axis 105 and/or the intermediate axis 130 of the first and second intermediate shafts 127, 128. This plane which is common to the considered axes may correspond to a plane of symmetry of the bifurcation formed by the arm 121. It can be vertical or inclined relative to the vertical.

The first and second drive axes 135, 136 are for example oriented generally axially. They are for example substantially parallel to the longitudinal axis 105. The axial orientation of the first and second drive axes 135, 136 aims at promoting the axial extension of the arm 121 which houses the generator assembly 129 in the bifurcation, rather than an increase in height of the secondary flow path 106. The term "height" of the secondary flow path 106, means the radial dimension of the secondary flow path 106. In other words, the height of the secondary flow path 106 corresponds to the distance, taken radially by relative to the longitudinal axis 105, between the outer shroud 117 and the outer annular wall 119 of the hub 118. This further allows limiting the master cross-section of the arm 121.

The first ends 131a, 133a of the first and second drive shafts 131, 133 are for example located upstream, while the second ends 131b, 133b of the first and second drive shafts 131, 133 are located downstream. This allows limiting the dimensions of the first and second intermediate shafts 127, 128 along the intermediate axis 130.

The first alternator(s) 132 are for example located upstream, while the second alternator(s) 134 are located downstream.

Figure 4:
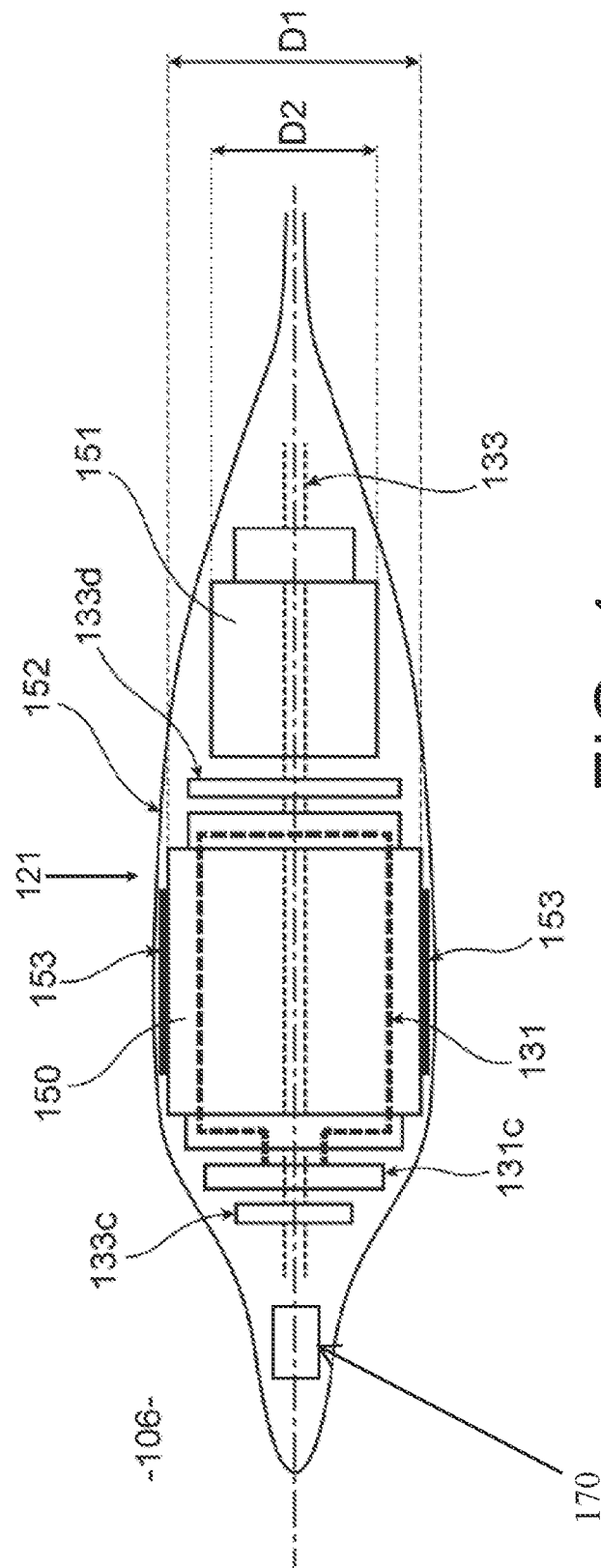
FIG. 4 is a schematic view, in tangential section, of an arm of the turbine engine illustrated in FIG. 1.

The first alternator(s) 132 and the second alternator(s) 134 can respectively be housed in a first housing 150 and in a second housing 151 which are themselves housed in the arm 121 (FIG. 4). The first housing 150 further has a transverse dimension D1, taken in a transverse direction, generally horizontal, perpendicular to the axial dimension of gas flow, greater than that D2 of the second housing 151. In this manner, it is possible to take advantage of the aerodynamic profile of the shaft 121 whose section, taken tangentially relative to the longitudinal axis 105, is wider upstream than downstream in the axial direction of gas flow, by installing first alternators 132 which are larger than the second 134 alternators.

The first housing 150 can also be arranged in contact, in particular generally tangential relative to the longitudinal axis 105, with or even flush with a wall 152 of the arm 121, so as to improve the cooling of the first alternators 132 by the secondary flow circulating in the secondary flow path 106. The first housing 150 is for example in contact with the wall 152 via a layer of heat conductive material adapted to prevent a wear by friction of the wall 152 and of the first housing 150 and/or to dampen vibrations, such as a silicone elastomer. The contact areas between the first housing 150 and the wall 152 of the arm 121 are referenced 153 in FIG. 4.

Alternatively (not represented), the first and second drive axes 135, 136 are oriented generally radially relative to the longitudinal axis 105. The radial orientation of the first and second drive axes 135, 136 aims at promoting the increase in height of the secondary flow path 106, rather than the axial extension of the arm 121 which houses the generator assembly 129 in the bifurcation. This further allows limiting the master cross-section of the arm 121.

The first ends 131a, 133a of the first and second drive shafts 131, 133 are for example located radially inside relative to the longitudinal axis 105, while the second ends 131b, 133b of the first and second drive shafts drive 131, 133 are located radially outside. This allows limiting the dimensions of the first and second intermediate shafts 127, 128 along the intermediate axis 130.

Alternatively (not represented), the first and second drive axes 135, 136 are inclined both axially and radially. This allows obtaining a compromise between the axial extension of the arm 121 which houses the generator assembly 129 in the bifurcation and the increase in the height of the secondary flow path 106.

According to the second embodiment illustrated in FIG. 2, the generator assembly 129 of the turbine engine 100B comprises, in addition to the first and second drive shafts 131, 133 and the first and second alternators 132, 134, a third drive shaft 137, one or more third alternators 138, a fourth drive shaft 139 and one or more fourth alternators 140.

The third drive shaft 137 is designed to draw mechanical power from the first drive shaft 131 and to rotate, relative to the casing 117, 118, 121, about a third drive axis 141.

The fourth drive shaft 139 is designed to draw mechanical power from the second drive shaft 133 and to rotate, relative to the casing 117, 118, 121, about a fourth drive axis 142.

The third and fourth drive shafts 137, 139 are coaxial and each designed to rotate, independently of each other and in an opposite direction of rotation, about the third and fourth drive axes 141, 142 which coincide. The third or the fourth drive shaft 137, 139 thus surrounds the fourth or the third drive shaft 139, 137. The third and fourth drive shafts 137, 139 are concentric. They are also counter-rotating. In the example illustrated in FIG. 2, it is the third drive shaft 137 which surrounds the fourth drive shaft 139. The generator assembly 129 is thus less bulky for the same produced electrical power. This also allows limiting the master cross-section of the arm 121. The performance in the "windmilling" phase is improved when it is the third drive shaft 137 which surrounds the fourth drive shaft 139.

The third alternator(s) 138 each comprise an inductor rotor mounted secured in rotation with one of the third and fourth drive shafts 137, 139 and an induced rotor mounted secured in rotation with the other of the third and fourth drive shafts 137, 139 and located facing the inductor rotor. The third alternators 138 are for example evenly distributed along the third and fourth drive shafts 137, 139.

In this manner, the relative rotation of the inductor rotor of the or each of the third alternators 138 relative to the induced rotor of said third alternator 138 creates a variation in the electromagnetic flux which induces an alternating electric current in the induced rotor.

Moreover, the inductor and induced rotors of the or each of the third alternators 138 being able to rotate in an opposite direction of rotation relative to each other, the generator assembly 129 allows producing even more electrical power.

The inductor rotor of the or each of the third alternators 138 comprises for example at least one permanent magnet or at least one electromagnet formed by a winding which is direct current powered, while the induced rotor of the or each of the third alternators 138 comprises at least one winding.

The fourth alternator(s) 140 each comprise an inductor rotor mounted secured in rotation with that of the third and fourth drive shafts 137, 139 which is surrounded by the other of the third and fourth drive shafts 137, 139, herein the fourth drive shaft 139, and an induced stator which is fixed relative to the casing 117, 118, 121 and therefore relative to the inductor rotor. The fourth alternators 140 are for example evenly distributed along the fourth drive shaft 139.

In this manner, the rotation of the inductor rotor of the or each of the fourth alternators 140 relative to the fixed induced stator of said fourth alternator 140 creates a variation in the electromagnetic flux which induces an alternating electric current in the induced stator.

The addition of the third and fourth drive shafts 137, 139 as well as the third and fourth alternators 138, 140 allows increasing the electrical power produced by the generator assembly 129.

The inductor rotor of the or each of the fourth alternators 140 comprises for example at least one permanent magnet. Alternatively, the inductor rotor of the or each of the fourth alternators 138, 140 comprises at least one electromagnet formed by a winding which is direct current powered.

The induced stator of the or each of the fourth alternators 138, 140 comprises for example at least one winding.

The third and fourth drive shafts 137, 139 each extend along the third or fourth drive axes 141, 142, which coincide, between a first end 137a, 139a and a second opposite end 137b, 139b.

The third and fourth alternators 138, 140 are for example arranged on opposite sides of that of the third and fourth drive shafts 137, 139 which is surrounded by the other of the third and fourth drive shafts 138, 140, along the third and fourth drive shafts 141, 142. The third alternators 138 are for example arranged on the side of the first end 137a, 139a of that of the third and fourth drive shafts 137, 139 which is surrounded by the other of the third and fourth drive shafts 137, 139, while the fourth alternators 140 are arranged on the side of the second end 137b, 139b of said third and fourth drive shafts 137, 139. In FIG. 1, the third alternators 138 are arranged on the side of the first end 137a of the third drive shaft 137, while the fourth alternators 140 are arranged on the side of the second end 139b of the fourth drive shaft 139.

The first end 137a, 139a of each of the third and fourth drive shafts 137, 139 is designed to draw mechanical power from the first or second drive shaft 131, 133.

For this, the first end 137a, 139a of each of the third and fourth drive shafts 137, 139 carries for example a first toothed wheel 137c, 139c which is secured in rotation with the third or the fourth drive shaft 137, 139 about the third or fourth drive axis 141, 142. The first toothed wheel 137c, 139c of the third and fourth drive shafts 137, 139 is further meshed with the first toothed wheel 131c, 133c of the first or second shaft 131, 133, or with a second toothed wheel 133d itself carried by the first or second drive shaft 131, 133 and mounted secured in rotation on the first or second drive shaft 131, 133 about the first or second drive axis 135, 136.

In the example illustrated in FIG. 2, the first toothed wheel 137c of the third drive shaft 137 is meshed with the first toothed wheel 131c of the first drive shaft 131, while the first toothed wheel 139c of the fourth drive shaft 139 is meshed with a second toothed wheel 133d of the second drive shaft 133.

Where appropriate, the first toothed wheel(s) 137c, 139c of the third and fourth drive shafts 137, 139 which are engaged with the first toothed wheel(s) 131c, 133c of the first or second drive shaft 131, 133, are conically toothed.

Where appropriate, the second toothed wheel(s) 133d of the first or second drive shaft 131, 133 are for example straight-toothed. The first toothed wheel(s) 137c, 139c of the first and second drive shafts 131, 133 which are engaged with the second toothed wheel(s) 133d of the first or second drive shaft 131, 133, are themselves straight-toothed.

The longitudinal axis 105 and the first, second, third and fourth drive axes 135, 136, 141, 142 are for example comprised in the same plane. This allows, for example, taking advantage of the entire height of the secondary flow path 106, without increasing the master cross-section of the arm 121.

The first, second, third and fourth drive axes 135, 136, 141, 142, which are parallel to each other in the example of FIG. 2, are for example coplanar with the longitudinal axis 105 and/or the intermediate axis 130 of the first and second intermediate shafts 127, 128.

The third and fourth drive axes 141, 142 are for example respectively parallel to the first and second drive axes 135, 136.

The third and fourth drive axes 141, 142 are for example oriented generally axially. They are substantially parallel to the longitudinal axis 105.

The first ends 137a, 139a of the third and fourth drive shafts 137, 139 are for example located upstream, while the second ends 137b, 139b of the third and fourth drive shafts 137, 139 are located downstream. This allows limiting the dimensions of the first and second intermediate shafts 127, 128 along the intermediate axis 130.

The third alternator(s) 138 are for example located upstream, while the fourth alternator(s) 140 are located downstream.

Figure 5A:
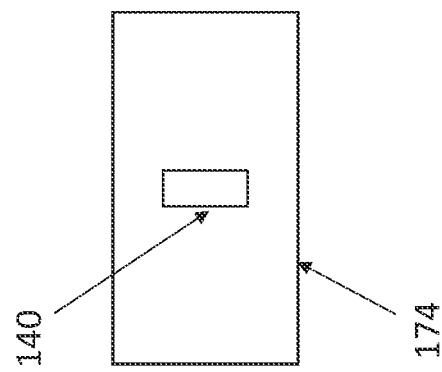
FIG. 5A is a schematic view of a third alternator in a third housing.
Figure 5B:
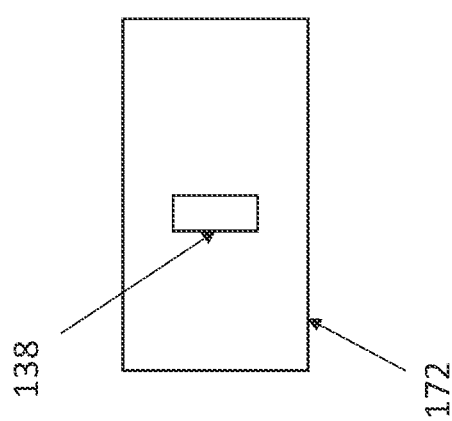
FIG. 5B is a schematic view of a fourth alternator in a fourth housing.

The third alternator(s) 138 and the fourth alternator(s) 140 can respectively be housed in the first housing 150 or a third housing 172 (FIG. 5A) itself housed in the arm 121 and in the second housing 151 or a fourth housing 174 (FIG. 5B) itself housed in the arm 121.

Where appropriate, the third housing has a transverse dimension, taken in a transverse direction, generally horizontal, perpendicular to the axial dimension of gas flow, which is greater than that of the fourth housing. In this manner, it is possible to take advantage of the aerodynamic profile of the shaft 121 whose section, taken tangentially relative to the longitudinal axis 105, is wider upstream than downstream in the axial direction of gas flow, by installing third alternators 138 which are larger than the fourth alternators 140.

Where appropriate, the third housing is in contact, in particular generally tangential relative to the longitudinal axis 105, with or even flush with the wall 152 of the arm 121, so as to improve the cooling of the third alternators 138 by the secondary flow circulating in the secondary flow path 106. The third housing is for example in contact with the wall 152 via a layer of layer of heat conductive material adapted to prevent wear by friction of the wall 152 and of the third casing and/or to dampen the vibrations, such as a silicone elastomer.

The third and fourth drive shafts 137, 139 are for example located radially outside relative to the longitudinal axis 105, while the first and second drive shafts 131, 133 are located radially inside. This also allows limiting the dimensions of the first and second intermediate shafts 127, 128 along the intermediate axis 130.

Alternatively (not represented), the first and second drive axes 135, 136 are oriented generally radially relative to the longitudinal axis 105.

The first ends 137a, 139a of the third and fourth drive shafts 137, 139 are for example located radially inside relative to the longitudinal axis 105, while the second ends 137b, 139b of the third and fourth drive shafts 137, 139 are located radially outside. This allows limiting the dimensions of the first and second intermediate shafts 127, 128 along the intermediate axis 130.

The third and fourth drive shafts 137, 139 are for example located downstream, while the first and second drive shafts 131, 133 are located upstream. This also allows limiting the dimensions of the first and second intermediate shafts 127, 128 along the intermediate axis 130.

Alternatively (not represented), the third and fourth drive axes 135, 136 are inclined both axially and radially. This allows obtaining a compromise between the axial extension of the arm 121 which houses the generator assembly 129 in the bifurcation and the increase in the height of the secondary flow path 106.

Thus, according to this second embodiment, the first and second drive shafts 131, 133 form a first pair of drive shafts, while the third and fourth drive shafts 137, 139 form a second pair of drive shafts. Of course, one or more pairs of additional drive shafts can be provided, such as a third pair of drive shafts (not represented) drawing mechanical power from the second pair of drive shafts 137, 139 in the same manner as the second pair of drive shafts 137, 139 draws mechanical power from the first pair of drive shafts 131, 133, or even a fourth pair of drive shafts (not represented) drawing mechanical power from the third pair of drive shafts in the same manner as the third pair of drive shafts draws mechanical power from the second pair of drive shafts 137, 139, etc. The description above therefore remains applicable to these pairs of additional drive shafts.

According to the third embodiment illustrated in FIG. 3, the generator assembly 129 of the turbine engine 100C comprises an inner drive shaft 143 designed to rotate relative to the casing 117, 118, 121 about a drive axis 144, an outer drive shaft 145 designed to rotate relative to the casing 117, 118, 121 around the inner drive shaft 143 in an opposite direction of rotation, as well as one or more alternators 146. The inner and outer drive shafts 143, 145 are concentric. They are further counter-rotating.

The inner drive shaft 143 is further designed to draw mechanical power from the first intermediate shaft 127 or from the second intermediate shaft 128, while the outer drive shaft 145 is designed to draw mechanical power from the second intermediate shaft 128 or from the first intermediate shaft 127. In the example illustrated in FIG. 3, the inner drive shaft 143 draws mechanical power from the first intermediate shaft 127, while the outer shaft drive 145 draws mechanical power from the second intermediate shaft 128.

The alternator(s) 146 each comprise an inner body 146a, inductor or induced, mounted secured in rotation with the inner drive shaft 143 and an outer body 146b, induced or inductor, mounted secured in rotation with the outer drive shaft 145 and located facing the inner body 146a. The alternators 146 are for example evenly distributed along the inner and outer drive shafts 143, 145.

In this manner, the relative rotation of the inner body 146a of each of the alternators 146 relative to the outer body 146b of said alternator 146 creates a variation in the electromagnetic flux which induces an alternating electric current in the inner body 146a or in the outer body 146b.

Furthermore, the inner body 146a and the outer body 146b of each of the alternators 146 being able to rotate in an opposite direction of rotation relative to each other, the generator assembly 129 allows producing more electrical power.

The inner body 146a of the alternators 146 comprises for example at least one permanent magnet or at least one electromagnet formed by a winding which is direct current powered, while the outer body 146b of the alternators 146 comprises at least one winding.

Alternatively (not represented), the outer body 146b of the alternators 146 comprises for example at least one winding, while the outer body 146b of the alternators 146 comprises at least one permanent magnet or at least one electromagnet formed by a winding which is direct current powered. The inner and outer drive shafts 143, 145 each extend along the drive axis 144 between a first end 143a, 145a and an opposite second end 143b, 145b.

The first end 143a, 145a of each of the inner and outer drive shafts 143, 145 is designed to draw mechanical power from the first or the second intermediate shaft 127, 128.

For this, the first end 143a, 145a of each of the inner and outer drive shafts 143, 145 carries for example a toothed wheel 143c, 145c which is secured in rotation with the inner or outer drive shaft 143, 145 about the drive axis 144. The toothed wheel 143c, 145c of the inner and outer drive shafts 143, 145 is further meshed with the second toothed wheel 127d, 128d of the first or second intermediate shaft 127, 128.

The toothed wheels 143c, 145c of the inner and outer drive shafts 143, 145 as well as the second toothed wheels 127d, 128d of the first and second intermediate shafts 127, 128 are for example conically toothed.

When the first and second intermediate shafts 127, 128 are designed to rotate in the same direction of rotation, an additional pinion is for example provided to transmit mechanical power between the toothed wheels 127d, 143c of the first intermediate shaft 127 and that of the inner and outer drive shafts 143, 145 which it drives or between the toothed wheels 128d, 145c of the second intermediate shaft 128 and that of the inner and outer drive shafts 143, 145 which it drives, in order to reverse the direction of rotation of the inner and outer drive shafts 143, 145.

The drive axis 144 is for example coplanar with the longitudinal axis 105 and/or the intermediate axis 130 of the first and second intermediate shafts 127, 128.

The drive axis 144 is for example oriented generally radially relative to the longitudinal axis 105. The radial orientation of the drive axis 144 aims at promoting the increase in height of the secondary flow path 106, rather than the axial extension of the arm 121 which houses the generator assembly 129 in the bifurcation. This further allows limiting the master cross-section of the arm 121.

The first ends 143a, 145a of the inner and outer drive shafts 143, 145 are for example located radially inside relative to the longitudinal axis 105, while the second ends 143b, 145b of the inner and outer drive shafts 143, 145 are located radially outside. This allows limiting the dimensions of the first and second intermediate shafts 127, 128 along the intermediate axis 130.

Alternatively (not represented), the drive axis 144 is oriented generally axially. It is substantially parallel to the longitudinal axis 105. The axial orientation of the drive axis 144 aims at promoting the axial extension of the arm 121 which houses the generator assembly 129 in the bifurcation, rather than an increase in height of the secondary flow path 106.

The first ends 143a, 145a of the inner and outer drive shafts 143, 145 are for example located upstream, while the second ends 143b, 145b of the inner and outer drive shafts 143, 145 are located downstream. This allows limiting the dimensions of the first and second intermediate shafts 127, 128 along the intermediate axis 130.

Alternatively (not represented), the drive axis 144 is inclined both axially and radially. This allows obtaining a compromise between the axial extension of the arm 121 which houses the generator assembly 129 in the bifurcation and the increase in the height of the secondary flow path 106.

Thus, according to this third embodiment, the inner and outer drive shafts 143, 145 form a pair of drive shafts. Of course, one or several pairs of additional drive shafts may be provided, such as a second pair of drive shafts (not represented) drawing mechanical power from the first pair of drive shafts formed by the inner and outer drive shafts 143, 145 in the same manner as the first pair of drive shafts 143, 145 draws mechanical power from the first and second intermediate shafts 127, 128 or even a third pair of drive shafts (not represented) drawing mechanical power from the second pair of drive shafts in the same manner as the second pair of drive shafts draws mechanical power from the first pair of drive shafts 143, 145, etc. The description above therefore remains applicable to these pairs of additional drive shafts. The longitudinal axis 105 and the drive axes 144 of these pairs of drive shafts 143, 145 are for example comprised in the same plane.

Intermediate pinions 147, 148 can further be provided to draw mechanical power from the first and second intermediate shafts 127, 128 and to transmit this mechanical power to the first toothed wheel 131c, 133c of the first and second drive shafts 131, 133 or to the toothed wheel 143c, 145c of the inner and outer drive shafts 143, 145. Intermediate pinions 147, 148 are for example illustrated in FIG. 3.

In the case of an additional pinion reversing the direction of rotation of the inner and outer drive shafts 143, 145, this additional pinion is added to the intermediate pinions 147, 148, transmitting mechanical power either from one of the first and second intermediate shafts 127, 128 to one of the intermediate pinions 147, 148, or from one of the intermediate pinions 147, 148 to one of the inner and outer drive shafts 143, 145.

The turbine engine 100A, 100B, 100C may further comprise a regulation system 149 via which the generator assembly 129 delivers electrical energy to the accessory or accessories 125, 126.

The regulation system 149 is in particular designed to receive the alternating electric currents produced by the first and second alternators 132, 134, and/or by the third and fourth alternators 138, 140 or by the alternators 146 and to deliver, from these alternating electric currents, an electric current capable of operating the accessory or accessories 125, 126.

The regulation system 149 is for example provided with an electrical energy storage device (not represented) designed to store the excess electrical energy produced by the generator assembly 129 and to deliver the stored electrical energy to the accessory or accessories 125, 126, when the electrical energy produced by the generator assembly 129 is not sufficient to power the accessory or accessories 125, 126.

What is claimed is:

1. A bypass turbine engine comprising, from upstream to downstream in an axial direction of gas flow, a fan and a splitter nose from which originate a primary stream flow channel, called a primary flow path, and a secondary stream flow channel, called a secondary flow path, which surrounds the primary flow path, the turbine engine further comprising:
 a fixed casing comprising an arm which extends radially, relative to a longitudinal axis, in the secondary flow path,
 a first shaft, called a low pressure shaft, designed to rotate relative to the casing about the longitudinal axis oriented in the axial direction of the gas flow,
 a second shaft, called a high pressure shaft, designed to rotate relative to the casing around the low pressure shaft, the high pressure and low pressure shafts being concentric,
 at least one accessory designed to be driven by a motor powered with electrical energy,
 an upper portion via which the turbine engine is intended to be attached to an aircraft,
 an opposite lower portion in a vertical direction orthogonal to the longitudinal axis, the arm extending generally vertically, in the lower portion, in the secondary flow path,
 the turbine engine being characterised in that it further comprises:
 a first intermediate shaft designed to draw mechanical power from the low pressure shaft,
 a second intermediate shaft designed to draw mechanical power from the high pressure shaft,
 an electrical energy generator assembly housed in the arm and coupled, on the one hand, to the first intermediate shaft and, on the other hand, to the second intermediate shaft, so as to receive the mechanical power from the first intermediate shaft, on the one hand, and the mechanical power from the second intermediate shaft, on the other hand, the generator assembly being further designed to convert the mechanical power received from the first and second intermediate shafts into electrical energy in order to power the motor(s) driving the accessory or accessories, the electrical energy powering the motor(s) driving the accessory or accessories thus originating simultaneously from the mechanical power drawn from the low pressure shaft and the mechanical power drawn from the high pressure shaft,
 wherein the generator assembly comprises:
 a first drive shaft designed to draw the mechanical power from the first intermediate shaft and to rotate relative to the casing about a first drive axis,
 a second drive shaft designed to draw the mechanical power from the second intermediate shaft and to rotate relative to the casing about a second drive axis, the first and second drive shafts being coaxial and each designed to rotate, in an opposite direction of rotation, about the first and second drive axes then coincident, one or more first alternators each comprising an inductor rotor mounted secured in rotation with one of the first and second drive shafts about the first and second drive axes and an induced rotor mounted secured in rotation with the other of the first and second drive shafts about the first and second drive axes, one or more second alternators each comprising an inductor rotor mounted secured in rotation, about the first and second drive axes, with that of the first and second drive shafts which is surrounded by the other of the first and second drive shafts, and an induced stator which is fixed relative to the inductor rotor of said second alternator, wherein the first and second drive axes are oriented generally in the axial direction of gas flow, wherein at least a portion of the one or more second alternators is located downstream of an entirety of the one or more first alternators in the axial direction of the gas flow.

2. The turbine engine according to claim 1, wherein the first and second intermediate shafts are coaxial and each designed to rotate, independently of each other, relative to the casing about the same intermediate axis.

3. The turbine engine according to claim 1, wherein the secondary flow path is delimited radially, relative to the longitudinal axis, by an outer shroud and an inner hub of the casing, the outer shroud and the hub being concentric and centred on the longitudinal axis, and wherein the arm, which houses the generator assembly, extends radially, relative to the longitudinal axis, between the outer shroud and the hub.

4. The turbine engine according to claim 1, wherein the arm houses, upstream in the axial direction of gas flow, ancillaries and, downstream in the axial direction of the gas flow, the generator assembly.

5. The turbine engine according to claim 1, wherein the generator assembly comprises:
a third drive shaft designed to draw mechanical power from the first drive shaft and to rotate relative to the casing about a third drive axis,
a fourth drive shaft designed to draw mechanical power from the second drive shaft and to rotate relative to the casing about a fourth drive axis, the third and fourth drive shafts being coaxial and each designed to rotate, in an opposite direction of rotation, about the third and fourth drive axes then coincident,
one or more third alternators each comprising an inductor rotor mounted secured in rotation with one of the third and fourth drive shafts about the third and fourth drive axes and an inductor rotor mounted secured in rotation with the other of the third and fourth drive shafts about the third and fourth drive axes,
one or more fourth alternators each comprising an inductor rotor mounted secured in rotation, about the third and fourth drive axes, with that of the third and fourth drive shafts which is surrounded by the other of the third and fourth drive shafts, and an induced stator which is fixed relative to the inductor rotor of said fourth alternator.

6. The turbine engine according to claim 5, wherein the longitudinal axis and the first, second, third and fourth drive axes are comprised in the same plane.

7. The turbine engine according to claim 6, wherein the third and fourth drive axes are respectively parallel to the first and second drive axes.

8. The turbine engine according to claim 7, wherein the third and fourth drive shafts being located radially outside relative to the longitudinal axis, while the first and second drive shafts are located radially inside.

9. The turbine engine according to claim 5, wherein:
the first alternators and third alternators are located upstream in the axial direction of gas flow, and the second alternators and fourth alternators are located downstream in the axial direction of gas flow.

10. The turbine engine according to claim 9, wherein:
the first alternator(s) and the second alternator(s) are respectively housed in a first housing and in a second housing themselves housed in the arm, the first housing having a transverse dimension, taken in a transverse direction, generally horizontal, perpendicular to the axial dimension of gas flow, which is greater than that of the second housing;

and/or the third alternator(s) and the fourth alternator(s) are respectively housed in the first housing or a third housing itself housed in the arm and in the second housing or a fourth housing itself housed in the arm, the third housing having a transverse dimension, taken in a transverse direction, generally horizontal, perpendicular to the axial dimension of the gas flow, which is greater than that of the fourth housing.

11. The turbine engine according to claim 10, wherein which the first housing and/or the third housing is arranged in contact with a wall of the arm.

12. The turbine engine according to claim 1, wherein the generator assembly comprises:
an inner drive shaft designed to rotate relative to the casing about a drive axis and to draw the mechanical power from the first intermediate shaft or from the second intermediate shaft,
an outer drive shaft designed to rotate relative to the casing around the inner drive shaft in an opposite direction of rotation and to draw the mechanical power from the second intermediate shaft or from the first intermediate shaft, the inner and outer drive shafts being concentric,
one or more alternators each comprising an inner body, inductor or induced, mounted secured in rotation with the inner drive shaft about the drive axis and an outer body, induced or inductor, mounted secured in rotation with the outer drive shaft about the drive axis and located facing the inner body.

13. The turbine engine according to claim 12, wherein:
the drive axis is oriented generally radially relative to the longitudinal axis;

or the drive axis is oriented generally in the axial direction of gas flow.

* * * * *